April 6, 1937. H. O. WILLIAMS 2,076,490
METHOD OF FORMING A GRAVEL PACK ABOUT WELL SCREENS IN WELLS
Filed Feb. 11, 1936
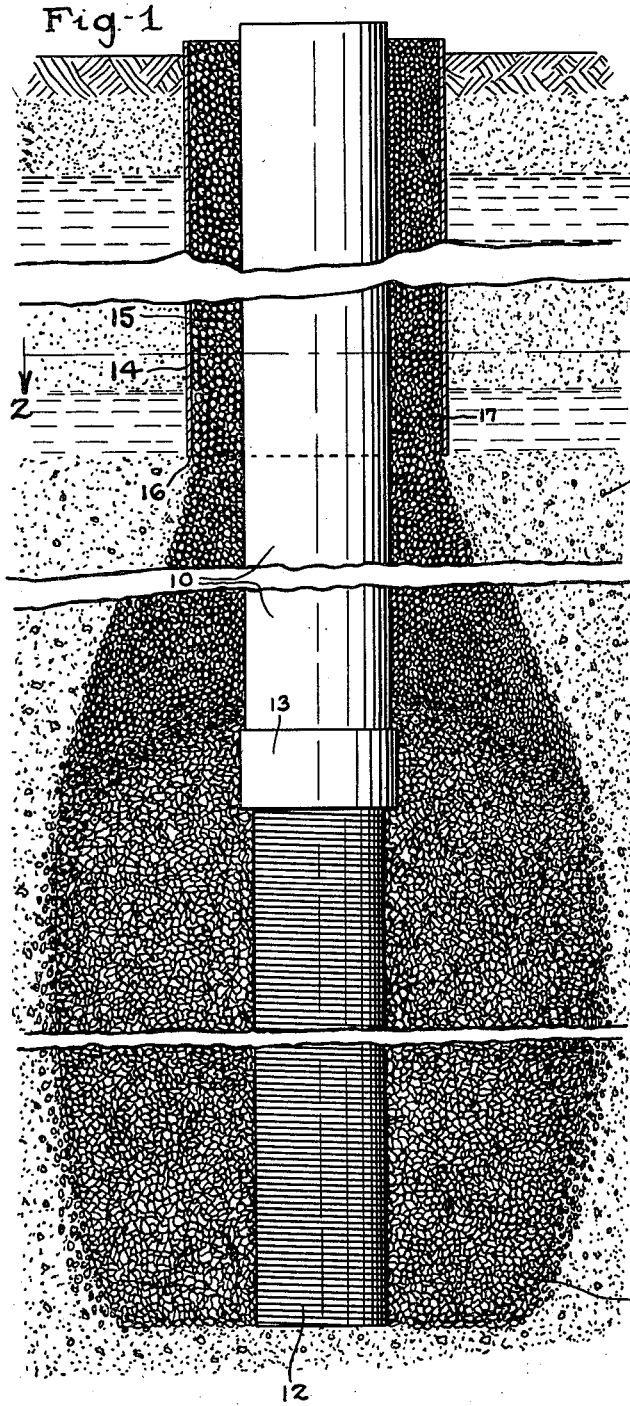
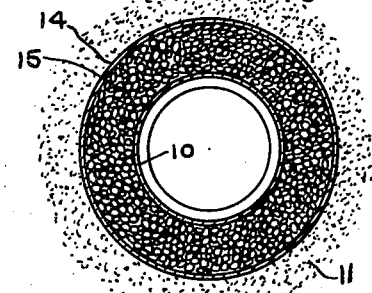
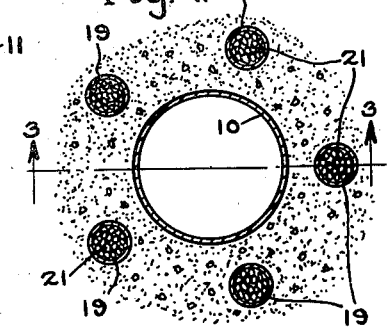
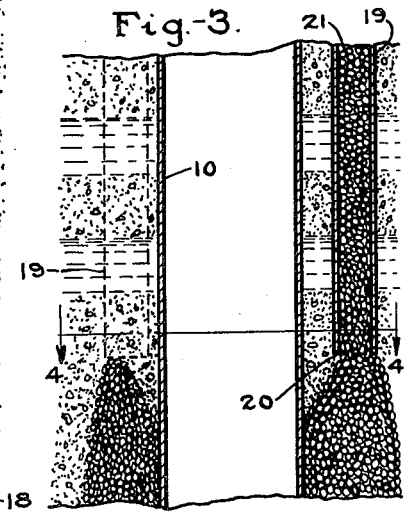
Inventor:
Howard O. Williams
By Whiteley and Ruckman
Attorneys Patented Apr. 6, 1937

2,076,490

UNITED STATES PATENT OFFICE 2,076,490

METHOD OF FORMING A GRAVEL PACK ABOUT WELL SCREENS IN WELLS

Howard O. Williams, Minneapolis, Minn., assignor to Edward E. Johnson, Incorporated, St. Paul, Minn.

Application February 11, 1936, Serial No. 63,375

3 Claims. (Cl. 166—21)

My invention relates to a method of forming a gravel pack about well screens in wells. In the practice of sinking wells, particularly those for providing a supply of water, it is customary to sink the main well casing through the overlying drift, or drift and rock, into the water-bearing sand and to a depth in said stratum of sand sufficiently great to accommodate the well screen which it is proposed to employ. The diameter of this screen is, of course, determined by the diameter of the outer well casing, being only so great in diameter as will permit its being dropped down through said well casing, or, in some instances, the screen may be formed integral with the casing. The length of the well casing will be determined by the thickness of the overlying drift and the depth into the water-bearing strata to which the well is sunk. A common and satisfactory length of well screen in these types of water-bearing strata is sixteen feet. The well screen will be dropped down through the casing which ordinarily has been sunk to a point approximating the bottom of the screen when set, and the screen will be held while the casing is raised, whereby the well screen is set in position in the water-bearing stratum.

After this has been done there follows what is referred to in the well-drilling business as "developing" the well. This developing of the well consists in pumping water therefrom and along with the water such sand and fine material as finds its way through the slot openings in the walls of the well screen. If the water-bearing stratum includes a considerable amount of gravel of varying size, including small particles equivalent to coarse sand, the mass of such particles too large to pass through the openings of the screen will, as the fine sand or fine particles are withdrawn with the pumped water, arrange themselves about the walls of the screen, forming what is known as a gravel pack. If the water-bearing stratum is made up largely of such large and small particles, too large to pass the screen, a normal and satisfactory development of the well is effected simply by continuing pumping. There will not be very much material, as sand or fine particles, pumped out, and little or no likelihood or tendency of the overlying drift to sink or cave to take up the space previously occupied by the fine material. If, however, the amount of fine material is relatively large, but there is still enough mixture of coarse and fine gravel particles too large to pass the screen to develop a suitable gravel pack, there may be so much removal of the fine material as to cause sinking and caving of the formations overlying the well.

Heretofore it has been proposed to remedy this difficulty by putting down independent pipes to a point adjacent the top or sides of the well screen and introducing sized gravel through said pipes which forms the pack about the well screen and occupies the space of the withdrawn sand. In this practice the gravel pack around the screen is made entirely or principally by the sized gravel introduced. I have discovered that a much more effective and satisfactory gravel pack is produced when it consists of graded particles, not uniformly sized, of varying sizes from pieces of gravel too large to pass the openings of the screen, adjacent to the screen, and grading symmetrically outward from the screen into less uniform mixtures containing proportionately more fine gravel and sand, as the distance of location away from the screen increases. In such cases the pieces of varying sizes fit together more effectively and prevent subsequent disturbance such as plugging or channeling which often takes place in a pack formed of sized gravel, and which will result either in checking flow of water or in opening up new flows of sand into the screen, after the well is developed and in service.

It is the object of my invention to introduce the gravel, not to form any part of the gravel pack about the well, but to provide a tamping plug which will press the material of the water-bearing stratum down and around the well as it is developed, and will in that manner keep the spaces vacated by the withdrawn sand filled without tendency of caving or settling of overlying formations. At the same time, even where very large amounts of sand are withdrawn, the coarser material in the natural bed will ultimately move in and around the screen until a proper and highly effective gravel pack has been developed and fixed about the screen composed of the multi-sized grains and particles found scattered through and in the water-bearing stratum with the excess of sand which it contains.

In the practice of my process the well casing will be sunk a suitable distance in the water-bearing stratum. The material of the water-bearing stratum will be withdrawn and analyzed as to its contents of fine sand and coarser particles. From this analysis the drilling engineer will determine the approximate amount of displacement and withdrawal of sand which will take place in developing the well with the coarser materials existing in the water-bearing stratum. From this calculation he will determine the distance above the top of the well screen at which the tamping, sized gravel will be introduced. In conjunction with the well casing a larger casing is provided, which will leave an annular space around the well casing to carry the sized gravel down for its tamping and filling work, or a series of smaller pipes about the main well casing may be provided for the same purpose. The bottoms of these casings or of the surrounding casing will be fixed a distance above the top of the screen, determined by the aforesaid calculation. Sized and free-flowing gravel will be introduced in the annular space between the two casings or in the small casings around the main casing, and the development of the well will be undertaken by pumping a heavy stream of water through the screen and discharging it from the well, and employing customary means of agitation, such as surging, swabbing and the like. As sand is withdrawn the free-flowing sized gravel will constantly press downward, pushing the natural material under it to take up the space theretofore occupied by the withdrawn sand, and spreading laterally in cone shape. When all sand which will flow has been removed, and the natural gravel pack has been formed around the well screen, the tamping mass of sized gravel will have reached a point nearly to but not at the top of the well screen, and will have filled in a packed and unyielding position a space above the gravel pack about the screen equivalent to the space left by the withdrawn sand, so that there can be no sinking or caving of the ground about the well. The gravel feeding pipe or pipes may then be left or withdrawn as desired, their holes being left filled with gravel and the well will be completely and satisfactorily developed.

In the drawing, illustrating somewhat diagrammatical means for carrying out my process,—

Fig. 1 is a diagrammatic fragmentary sectional elevation of a well in place with a surrounding tube for conveying the sized gravel in practicing my process. Fig. 2 is a sectional view taken on line 2—2 of Fig. 1. Fig. 3 is a longitudinal fragmentary view taken on line 3—3 of Fig. 4 showing surrounding pipes for conveying the sized gravel in the practice of my process. Fig. 4 is a sectional plan view on line 4—4 of Fig. 3.

As illustrated, the well casing 10 is sunk a suitable distance in the water-bearing stratum 11, that distance normally being determined by the character of material comprising said water-bearing stratum and the amount of fine sand that will have to be withdrawn in developing. The well screen 12 is set in proper position in said water-bearing stratum, as shown in Fig. 1, wherein the casing 10 has been lifted to seal-in the well screen at 13 in a customary manner. A surrounding pipe or tube 14 has been sunk about well casing 10 so as to leave a suitable annular space 15 between it and the well casing. The approximate volume of fine material to be withdrawn from the stratum in order to produce the desired gravel pack having been calculated, the end 16 of pipe 17 is now brought to the proper height above the top of the screen so that the necessary sized gravel when introduced at that point will compensate for the material withdrawn from the stratum below without itself becoming an integral part of such gravel pack about the well screen. That is, the bottom 16 will be positioned a distance above the top of the screen 13 such that the flow of tamping, sized gravel 17 fed down through said annular space 15 will, when the well has been completely developed, take up a volume equivalent to that occupied by the withdrawn sand and yet will not reach quite to or become a part of the gravel pack 18 which is developed about the screen 12. The free flowing of the sized gravel is assisted where desired by running water through the said gravel in the conveying pipe or pipes.

In the practice of the process as disclosed in Figs. 3 and 4 a multiplicity of smaller pipes 19 will be sunk about well casing 10, their bottoms 20 reaching approximately to the same point above the top 13 of the well screen as would the bottom 16 of the surrounding tube 14, so that also in this form of the invention the sized gravel 21 fed through the pipes 19 will act as a tamping and filling medium to occupy a volume equivalent to that of the removed sand and at the same time not reach to or become a part of the gravel pack 18 developed from the materials in the water-bearing stratum.

In this manner a highly effective gravel pack made up of many sizes of particles from those just coarse enough not to pass the screen to largest particles and coming only from the material in the water-bearing stratum will be formed and be held in a highly stable position for long and effective service in the operation of the well.

I claim:

1. A process of forming a gravel pack about well screens which consists in sinking the well casing a requisite distance into the water-bearing stratum and setting the well screen in said stratum at the bottom of the casing, taking material of said stratum from areas about said well screen and determining therefrom the bulk of fine sand which will be withdrawn through the well screen in the natural development of the well, providing gravel conveying means and sinking it through the drift to a point above and removed from the top of the well screen a distance which, based on said determination, will allow feed of sized gravel in quantity such as to occupy a volume equivalent to that of the withdrawn sand by moving the material of the stratum downward beneath the mass of fed-in sized gravel so that the well screen will be developed from many sized particles of material in the water-bearing stratum and the fed-in sized gravel will form no part of the gravel pack about the well screen, and feeding sized free-flowing gravel through said conveying means to said point a predetermined distance above and removed from the top of the well screen while the well is being developed, so as to act as a tamping means and to occupy the space of the sand withdrawn in developing the well but to form no part of the developed gravel pack about the well screen.

2. A process of forming a gravel pack about well screens which consists in sinking the well casing a requisite distance into the water-bearing stratum and setting the well screen in said stratum at the bottom of the casing, taking material of said stratum from areas about said well screen and determining therefrom the bulk of fine sand which will be withdrawn through the well screen in the natural development of the well, providing a larger sized tube about said well casing to form an annular space between it and the well casing and sinking it through the drift until its discharge end is at a point above and removed from the top of the well screen a distance which, based on said determination, will allow feed of sized gravel in quantity such as to occupy a volume equivalent to that of the withdrawn sand by moving the material of the stratum downward beneath the mass of fed-in sized gravel so that the well screen will be developed from many sized particles of material in the water-bearing stratum and the fed-in sized gravel will form no part of the gravel pack about the well screen, and feeding sized free-flowing gravel through said conveying means to said point a predetermined distance above and removed from the top of the well screen while the well is being developed, so as to act as a tamping means and to occupy the space of the sand withdrawn in developing the well but to form no part of the developed gravel pack about the well screen.

3. A process of forming a gravel pack about well screens which consists in sinking the well casing a requisite distance into the water-bearing stratum and setting the well screen in said stratum at the bottom of the casing, taking material of said stratum from areas about said well screen and determining therefrom the bulk of fine sand which will be withdrawn through the well screen in the natural development of the well, sinking a multiplicity of independent tubes about the well screen through the drift until their discharge ends are at a point above and removed from the top of the well screen a distance which, based on said determination, will allow feed of sized gravel in quantity such as to occupy a volume equivalent to that of the withdrawn sand by moving the material of the stratum downward beneath the mass of fed-in sized gravel so that the well screen will be developed from many sized particles of material in the water-bearing stratum and the fed-in sized gravel will form no part of the gravel pack about the well screen, and feeding sized free-flowing gravel through said conveying means to said point a predetermined distance above and removed from the top of the well screen while the well is being developed, so as to act as a tamping means and to occupy the space of the sand withdrawn in developing the well but to form no part of the developed gravel pack about the well screen.

HOWARD O. WILLIAMS.